United States Patent
Lai et al.

(10) Patent No.: US 10,492,193 B2
(45) Date of Patent: Nov. 26, 2019

(54) MULTI-STREAM DATA TRANSMISSION METHOD, APPARATUS, AND SYSTEM, AND ANCHOR

(71) Applicant: Huawei Technologies Co., Ltd., Shenzhen, Guangdong (CN)

(72) Inventors: Zhichang Lai, Shanghai (CN); Ziqiang Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 215 days.

(21) Appl. No.: 15/625,983

(22) Filed: Jun. 16, 2017

(65) Prior Publication Data

US 2017/0289976 A1  Oct. 5, 2017

Related U.S. Application Data

(63) Continuation of application No. PCT/CN2015/097694, filed on Dec. 17, 2015.

(30) Foreign Application Priority Data

Dec. 18, 2014 (CN) .......................... 2014 1 0803792

(51) Int. Cl.
*H04W 72/04* (2009.01)
*H04W 28/02* (2009.01)
(Continued)

(52) U.S. Cl.
CPC ......... *H04W 72/042* (2013.01); *H04W 28/02* (2013.01); *H04W 28/08* (2013.01); *H04W 84/045* (2013.01); *H04W 92/10* (2013.01)

(58) Field of Classification Search
CPC ... H04W 72/042; H04W 28/08; H04W 28/02; H04W 92/10; H04W 84/045
See application file for complete search history.

(56) References Cited

U.S. PATENT DOCUMENTS 9,832,796 B2 * 11/2017 Mehta .................. H04W 76/10
2013/0250881 A1 * 9/2013 Liao ...................... H04W 36/08
370/329

(Continued)

FOREIGN PATENT DOCUMENTS

CN  102215530 A  10/2011
CN  103202060 A   7/2013
(Continued)

OTHER PUBLICATIONS

IEEE Std 802.11b-1999,Part 11: Wireless LAN Medium Access Control(MAC) and Physical Layer (PHY) specifications:Higher-Speed Physical Layer Extension in the 2.4 GHz Band,IEEE-SA Standards Board,Approved Sep. 16, 1999,total 97 pages.
(Continued)

*Primary Examiner* — Will W Lin
(74) *Attorney, Agent, or Firm* — Leydig, Voit & Mayer, Ltd.

(57) ABSTRACT

A multi-stream data transmission method, including: obtaining, by an anchor, resource availability data of all data transmission paths from a UE, where the resource availability data includes resource data of wireless backhaul links between all access nodes and the anchor; determining, by the anchor, multiple target data transmission paths according to the resource availability data of all the data transmission paths; transmitting service data to the UE in a multi-stream manner by using the multiple target data transmission paths, where the multiple target data transmission paths include a corresponding wireless backhaul link that is established between a target access node and the anchor by using a wireless backhaul device; sending, by the target access node, the service data to the UE by using the corresponding wireless backhaul link; and obtaining, by the UE, the service data by using the multiple target data transmission paths.

14 Claims, 9 Drawing Sheets

(51) Int. Cl.
*H04W 28/08* (2009.01)
*H04W 84/04* (2009.01)
*H04W 92/10* (2009.01)

(56) References Cited

U.S. PATENT DOCUMENTS

| | | | |
|---|---|---|---|
| 2014/0079007 A1 | 3/2014 | Li et al. | |
| 2014/0269352 A1 | 9/2014 | Sun et al. | |
| 2014/0355562 A1* | 12/2014 | Gao | H04B 7/02 370/331 |
| 2015/0201373 A1 | 7/2015 | Fu et al. | |
| 2015/0304860 A1 | 10/2015 | Liu et al. | |
| 2015/0382258 A1* | 12/2015 | Schmidt | H04W 48/16 455/440 |
| 2016/0007223 A1* | 1/2016 | Sun | H04L 29/06 709/219 |
| 2016/0050611 A1* | 2/2016 | Wang | H04W 28/08 370/328 |
| 2016/0204974 A1 | 7/2016 | Chen et al. | |
| 2017/0223751 A1* | 8/2017 | Lin | H04W 68/005 |

FOREIGN PATENT DOCUMENTS

| | | |
|---|---|---|
| CN | 103338518 A | 10/2013 |
| CN | 103532909 A | 1/2014 |
| CN | 103609050 A | 2/2014 |
| CN | 104080121 A | 10/2014 |
| CN | 104581816 A | 4/2015 |
| EP | 2858325 A1 | 4/2015 |
| EP | 2876972 B1 | 9/2016 |
| WO | 2013070161 A1 | 5/2013 |
| WO | 2013185652 A1 | 12/2013 |
| WO | 2015039347 A1 | 3/2015 |

OTHER PUBLICATIONS

IEEE Std 802.1Q™-2005,IEEE Standard for Local and metropolitan area networks,Virtual Bridged Local Area Networks,IEEE Computer Society,May 19, 2006,total 303 pages.

IEEE Std 802.1Q™-2014,IEEE Standard for Local and metropolitan area networks—Bridges and Bridged Networks, IEEE Computer Society,total 1832 pages.

* cited by examiner

MULTI-STREAM DATA TRANSMISSION METHOD, APPARATUS, AND SYSTEM, AND ANCHOR

CROSS-REFERENCE TO RELATED APPLICATIONS

This application is a continuation of International Application No. PCT/CN2015/097694, filed on Dec. 17, 2015, which claims priority to Chinese Patent Application No. 201410803792.6, filed on Dec. 18, 2014. The disclosures of the aforementioned applications are hereby incorporated by reference in their entireties.

TECHNICAL FIELD

The present application relates to the field of communications technologies, and more specifically, to a multi-stream data transmission method, apparatus, and system, and an anchor.

BACKGROUND

With an increasing quantity of mobile users and a requirement for high-speed service experience, network layering and MSA (multi-stream aggregation) technologies are to be perfectly combined in a future wireless network. In this way, a mobile user in any location of the network can enjoy a high-speed and stable data connection service, thereby implementing an ultra-wideband, zero-wait time, and ubiquitous mobile broadband service and bringing high-speed and high-quality service experience.

Network layering refers to a multi-layer network architecture, including a host layer and a boosting layer. Referring to FIG. 1, FIG. 1 shows a schematic diagram of a network layering architecture. The host layer is mainly used to ensure network coverage and mainly includes a macro cell. By using an established host link, for example, a host link between users UEs (user equipment) 1 to 4 in FIG. 1, the host layer provides signaling transmission and basic data transmission for a user, provides a ubiquitous connection, and ensures a reliable basic service. The boosting layer is mainly used to increase network capacity and may include networks in various forms, such as a small cell (small cell, which may be a micro cell, a pico cell, a femto cell, or the like) and a WiFi AP (Wireless Fidelity node) (which may be a wireless local area network based on the IEEE 802.11b standard, an access point, or an access node) in FIG. 1. By using an established boosting link (boosting link system), the boosting layer provides high-rate data transmission for a user, and provides optimal user service experience for the user.

MSA is a key technology for organically integrating the host layer and the boosting layer. MSA uses a centralized node BBU pool (base band unit pool) or an SRC (single radio controller) and multiple distribution nodes to provide multi-stream aggregation for a user, that is, data on a network side may be sent to UE by using multiple transmission paths, thereby further improving user experience and increasing network capacity.

Referring to FIG. 2, FIG. 2 shows a schematic diagram of multi-stream data transmission in the prior art. UE accesses a cellular network by using a base station, and the base station uses a wireless backhaul device between the base station and the Internet to enable a data communication link between the UE and the Internet, so that the UE accesses the Internet. UE accesses a WLAN (wireless local area network) network by using a WiFi AP, and the WiFi AP uses a wireless backhaul device between the WiFi AP and the Internet to enable a data communication link between the UE and the Internet, so that the UE accesses the Internet. The base station and the WiFi AP may be referred to as access nodes for the UE to access a network.

Ina multi-stream data transmission scenario, UE may implement multi-stream transmission of data by using transmission paths between multiple base stations of a cellular network and the Internet, and/or transmission paths between multiple WiFi APs of a WLAN network and the Internet. Based on a network architecture shown in FIG. 2, during multi-stream data transmission in the prior art, a traffic distribution/aggregation control point of an MSA service shown in FIG. 2 is used to control traffic distribution and aggregation of a multi-stream transmission service. In addition, when a resource of an access link of the base station is available, and a resource of an access link of the WiFi AP is available, multiple data transmission paths are enabled, thereby implementing multi-stream transmission of data to UE.

The inventor of the present application finds through study that: in the network architecture shown in FIG. 2, the cellular network and the WLAN network are two independent networks, whose resources are independent; in particular, a first segment of transmission resource (a resource of a wireless backhaul link between a wireless backhaul device of the base station or a wireless backhaul device of the WiFi AP and a wireless backhaul device of the Internet shown in FIG. 2) close to a base station or WiFi AP side is also independent and cannot be shared. In the prior art, when the resource of the access link of the base station is available, and the resource of the access link of the WiFi AP is available, multi-stream transmission of data is enabled, without considering whether a resource of a wireless backhaul link on the base station or WiFi AP side is available. If multi-stream transmission is used when resources of a wireless backhaul link are insufficient, a data transmission rate may be reduced, and a failure to provide high-speed user service experience of multi-stream transmission may be caused.

SUMMARY

In view of this, embodiments of the present application provide a multi-stream data transmission method, apparatus, and system, and an anchor, so as to resolve the following problem in the prior art: When a resource of an access link of a base station is available, and a resource of an access link of a WiFi AP is available, multi-stream transmission of data is enabled; consequently, a data transmission rate of multi-stream transmission may be reduced, and high-speed user service experience of multi-stream transmission cannot be provided.

To achieve the foregoing objective, the embodiments of the present application provide the following technical solutions:

According to a first aspect, an embodiment of the present application provides a multi-stream data transmission system, including at least one access node, an anchor, and a wireless backhaul device, where data transmission is performed between each access node and the anchor by using a wireless backhaul link established by using a wireless backhaul device; where the anchor is configured to: obtain resource availability data of all data transmission paths from user equipment UE to the anchor, where the resource availability data includes resource data of wireless backhaul links between all access nodes and the anchor; determine multiple target data transmission paths according to the resource availability data of all the data transmission paths; and transmit service data to the UE in a multi-stream manner by using the multiple target data transmission paths, where the multiple target data transmission paths include a corresponding wireless backhaul link that is established between a target access node and the anchor by using a wireless backhaul device, and the target access node is an access node that is in the at least one access node and that transmits the service data; and the target access node is configured to send the service data to the UE by using the corresponding wireless backhaul link.

According to a second aspect, an embodiment of the present application provides a multi-stream data transmission apparatus, based on a macro-micro integrated network, where the macro-micro integrated network includes at least one access node, an anchor, and a wireless backhaul device, and data transmission is performed between each access node and the anchor by using a wireless backhaul link established by using a wireless backhaul device, where the apparatus is applied to the anchor, and the apparatus includes:

a data obtaining module, configured to obtain resource availability data of all data transmission paths from user equipment UE to the anchor, where the resource availability data includes resource data of wireless backhaul links between all access nodes and the anchor;

a path determining module, configured to determine multiple target data transmission paths according to the resource availability data of all the data transmission paths; and a multi-stream transmission module, configured to transmit service data to the UE in a multi-stream manner by using the multiple target data transmission paths, where the multiple target data transmission paths include a corresponding wireless backhaul link that is established between a target access node and the anchor by using a wireless backhaul device, and the target access node is an access node that is in the at least one access node and that transmits the service data.

According to a third aspect, an embodiment of the present application provides an anchor, including the foregoing multi-stream data transmission apparatus.

According to a fourth aspect, an embodiment of the present application provides a multi-stream data transmission method, based on a macro-micro integrated network, where the macro-micro integrated network includes at least one access node, an anchor, and a wireless backhaul device, and data transmission is performed between each access node and the anchor by using a wireless backhaul link established by using a wireless backhaul device, where the method is applied to the anchor, and the method includes:

obtaining resource availability data of all data transmission paths from user equipment UE to the anchor, where the resource availability data includes resource data of wireless backhaul links between all access nodes and the anchor;

determining multiple target data transmission paths according to the resource availability data of all the data transmission paths; and transmitting service data to the UE in a multi-stream manner by using the multiple target data transmission paths, where the multiple target data transmission paths include a corresponding wireless backhaul link that is established between a target access node and the anchor by using a wireless backhaul device, and the target access node is an access node that is in the at least one access node and that transmits the service data.

Based on the foregoing technical solutions, in the multi-stream data transmission system provided in the embodiments of the present application, an anchor may obtain resource availability data of all data transmission paths from UE to the anchor, where the resource availability data includes resource data of wireless backhaul links between all access nodes and the anchor; the anchor may determine multiple target data transmission paths according to the resource availability data of all the data transmission paths, and transmit service data to the UE in a multi-stream manner by using the multiple target data transmission paths, where the multiple target data transmission paths include a corresponding wireless backhaul link that is established between a target access node and the anchor by using a wireless backhaul device, and the target access node is an access node that is in the at least one access node and that transmits the service data; and the target access node further sends the service data to the UE by using the corresponding wireless backhaul link, so that the UE obtains the service data by using the multiple target data transmission paths. In the multi-stream data transmission method provided in the embodiments of the present application, resource data of a wireless backhaul link between each access node and the anchor is taken into consideration as a basis for selecting a target data transmission path. In this way, neglect of resource availability of a wireless backhaul link on a base station or WiFi AP side in the prior art no longer exists, thereby ensuring a rate of multi-stream data transmission. In the embodiments of the present application, in a macro-micro integrated networking architecture, dynamic multi-stream transmission is implemented with reference to a backhaul resource, and user service experience of high-speed and high-quality multi-stream data transmission is provided. In addition, utilization of a wireless access resource and a backhaul resource is maximized, congestion and a packet loss caused due to lack of backhaul resources are avoided, and a waste of a wireless resource on an access side is avoided.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show merely the embodiments of the present application, and a person of ordinary skill in the art may still derive other drawings from these accompanying drawings without creative efforts.

DESCRIPTION OF EMBODIMENTS

The following describes the technical solutions in the embodiments of the present application with reference to the accompanying drawings in the embodiments of the present application.

Figure 1:
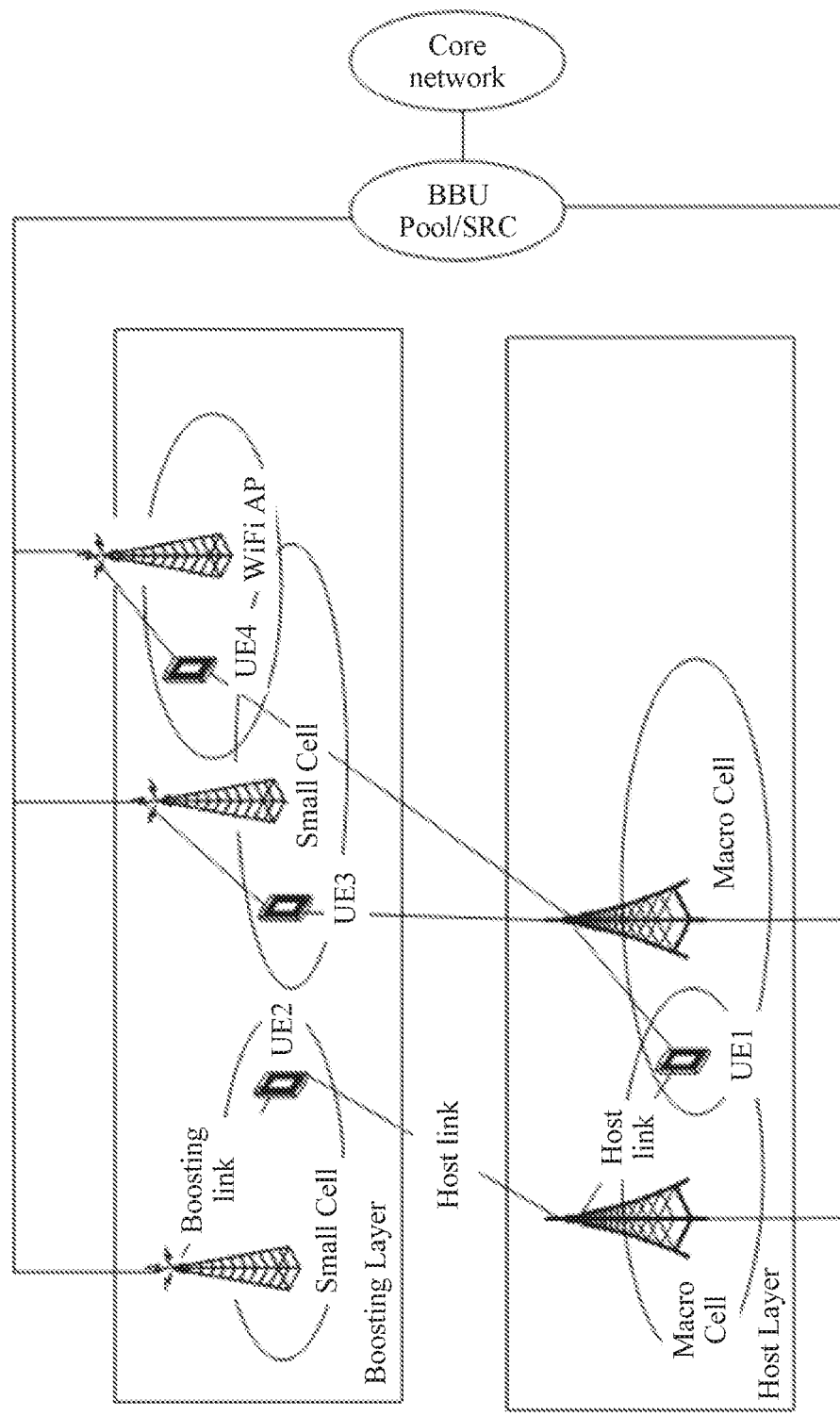
FIG. 1 is a schematic diagram of a network layering architecture in the prior art.
Figure 2:
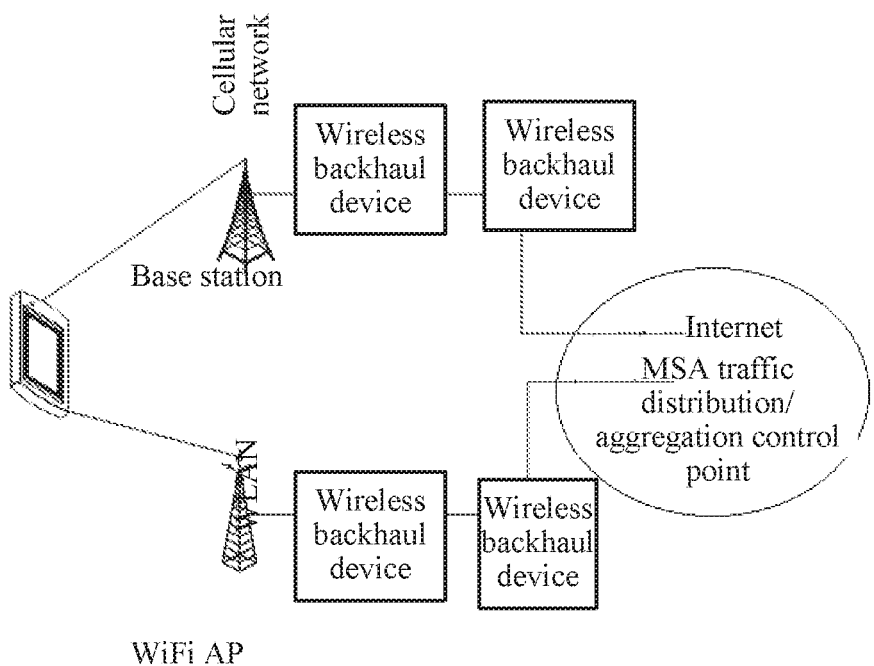
FIG. 2 is a schematic diagram of multi-stream data transmission in the prior art.
Figure 3:
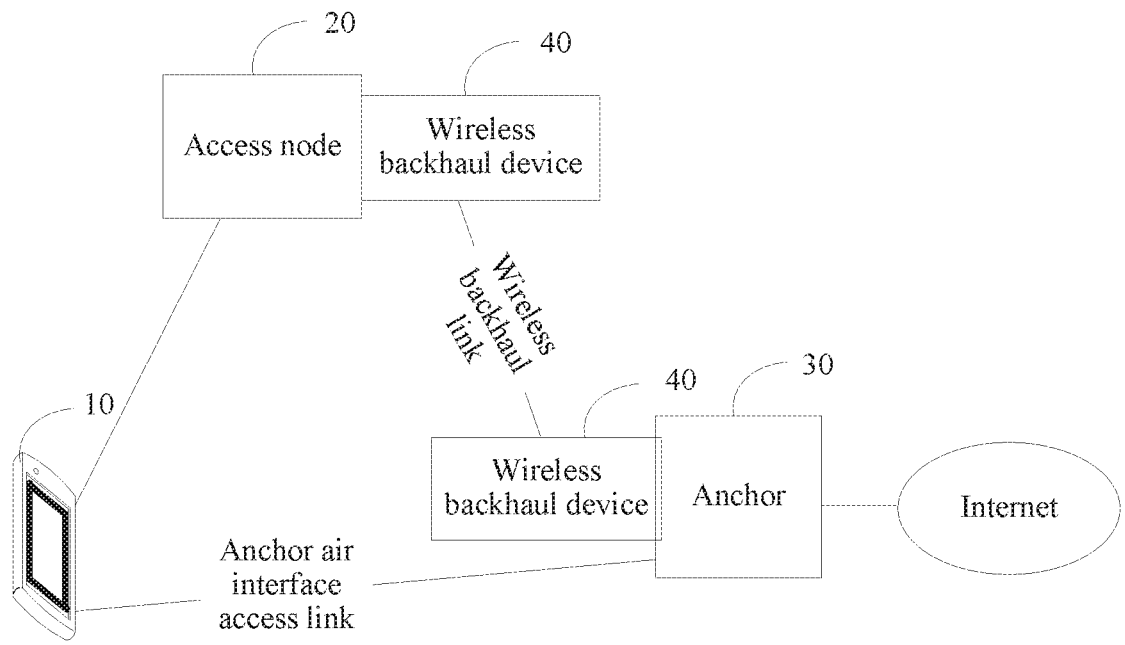
FIG. 3 is a network architecture diagram of a system for implementing a multi-stream data transmission method according to an embodiment of the present application.

FIG. 3 is a network architecture diagram of a system for implementing a multi-stream data transmission method according to an embodiment of the present application. The network architecture indicates a macro-micro integrated network. Referring to FIG. 3, the network architecture may include at least one access node 20, an anchor 30, and a wireless backhaul device 40. The anchor 30 may be a device such as a macro cell that supports a backhaul connection, supports access of UE, and supports functions of obtaining, allocating, and managing resource data of another node and link.

Optionally, the access node 20 may be a small cell (such as a base station), or maybe a WiFi AP or the like. The wireless backhaul device 40 is disposed on each access node 20, and each access node 20 may use the disposed wireless backhaul device 40 to establish a wireless backhaul link with the wireless backhaul device 40 disposed on the anchor 30. Optionally, data transmission may be performed between each access node and the anchor by using a wireless backhaul link established by using a wireless backhaul device.

Optionally, data transmission may be directly performed between UE and the anchor by using an anchor air interface access link, and therefore bypasses an access node.

It can be learned that in this embodiment of the present application, data transmission paths between the UE and the anchor include:

1. UE-access node-wireless backhaul link-anchor; and
2. UE-anchor air interface access link-anchor.

The data transmission path UE-access node-wireless backhaul link-anchor includes: a data transmission path UE-base station-wireless backhaul link-anchor and a data transmission path UE-WiFi AP-wireless backhaul link-anchor. There may be multiple data transmission paths UE-base station-wireless backhaul link-anchor. For example, when there are multiple base stations, there may be multiple corresponding wireless backhaul links. There may be multiple data transmission paths UE-WiFi AP-wireless backhaul link-anchor. For example, when there are multiple WiFi APs, there may be multiple corresponding wireless backhaul links.

A wireless backhaul manner used in the wireless backhaul link in this embodiment of the present application may be a point-to-multipoint (P2MP) radio transmission technology, such as sub-6 GHz band unlicensed transmission, sub-6 GHz band licensed transmission, or a self-backhaul technology of the anchor; or may be a point-to-point (Point-to-Point) radio transmission technology, such as transmission on a sub-6 GHz band, a conventional microwave band, or a high-frequency microwave greater than 60 GHz; or may be a combination of various radio transmission technologies mentioned above. Certainly, another radio transmission technology, for example, a P2P fiber or P2MP fiber transmission technology, may also be used. Listed above are merely examples.

It can be learned that for multi-stream data transmission in a direction from the anchor to the UE, a distribution point is at the anchor, and an aggregation point is at the UE; and for multi-stream data transmission in a direction from the UE to the anchor, a distribution point is at the UE, and an aggregation point is at the anchor. A service centralized control point of dynamic multi-stream data transmission is at the anchor, and the anchor decides and controls multi-stream data transmission in a centralized manner.

Figure 4:
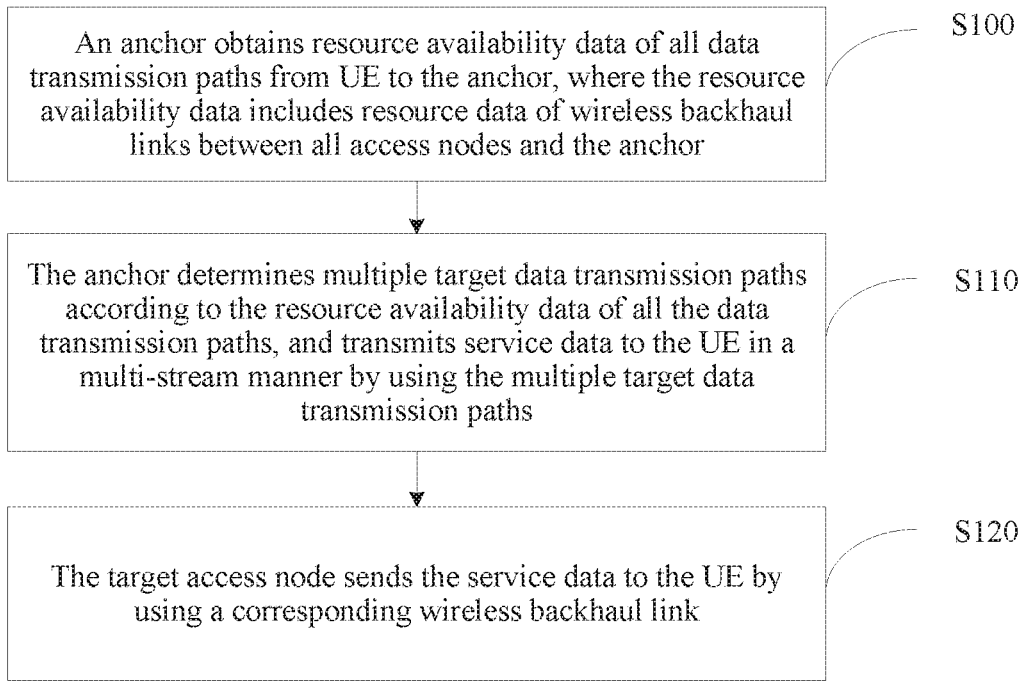
FIG. 4 is a flowchart of a multi-stream data transmission method according to an embodiment of the present application.

Based on the foregoing description, FIG. 4 shows a multi-stream data transmission method according to an embodiment of the present application. The method may be based on the macro-micro integrated network shown in FIG. 3. Referring to FIG. 4, the method may include the following steps.

Step S100: An anchor obtains resource availability data of all data transmission paths from the UE to the anchor, where the resource availability data includes resource data of wireless backhaul links between all access nodes and the anchor.

It can be learned that the data transmission paths between the UE and the anchor may include a data transmission path UE-access node-wireless backhaul link-anchor and a data transmission path UE-anchor air interface access link-anchor; and the data transmission path UE-access node-wireless backhaul link-anchor may further include: at least one data transmission path UE-base station-wireless backhaul link-anchor, including at least one base station, and/or at least one data transmission path UE-WiFi AP-wireless backhaul link-anchor, including at least one WiFi AP.

Optionally, the resource availability data that is of all the data transmission paths from the UE to the anchor and that is obtained by the anchor may include: resource data of air interface access links between all the access nodes and the UE, the resource data of the wireless backhaul links between all the access nodes and the anchor, and resource data of an anchor air interface access link between the UE and the anchor.

Optionally, the anchor may also obtain resource data of a transmission link between the anchor and a core network, so as to obtain resource information such as available bandwidth. For example, the anchor may detect a resource status of a transmission link between the anchor and the core network in real time, after processed, and then obtain resource information such as available bandwidth.

It can be learned that in this embodiment of the present application, during multi-stream data transmission, the resource data of the wireless backhaul links between all the access nodes and the anchor is detected, and a subsequent multi-stream data transmission procedure is guided by using the detected resource data of the wireless backhaul links between all the access nodes and the anchor. In this way, neglect of resource availability of a wireless backhaul link on a base station or WiFi AP side in the prior art no longer exists.

Step S110: The anchor determines multiple target data transmission paths according to the resource availability data of all the data transmission paths, and transmits service data to the UE in a multi-stream manner by using the multiple target data transmission paths, where the multiple target data transmission paths include a corresponding wireless backhaul link that is established between a target access node and the anchor by using a wireless backhaul device, and the target access node is an access node that is in the at least one access node and that transmits the service data.

Optionally, after obtaining the resource availability data of all the data transmission paths, the anchor may determine whether to enable multi-stream data transmission currently. Whether to use multi-path transmission (that is, multi-stream transmission) between the terminal UE and the anchor depends on multiple factors, including whether a service requested by the UE requires multi-path transmission, whether the UE supports multi-path transmission, whether multiple transmission paths exist between the UE and the anchor, whether resource availability on multiple transmission paths between the UE and the anchor matches multi-path transmission (for example, whether resources on the multiple transmission paths between the UE and the anchor can support multi-path transmission), whether resource availability between the anchor and the core network matches multi-path transmission (for example, whether resources between the anchor and the core network can support multi-path transmission), and the like.

Optionally, if whether to enable multi-stream data transmission is indicated by using a formula, the formula may be expressed as follows:

multi-path transmission between the terminal UE and the anchor (whether to enable a multi-stream transmission scheme)=f (a service requested by the UE, supportability of the UE, resource availability of multiple transmission paths between the UE and the anchor, and resource availability between the anchor and the core network).

In the following cases, the terminal UE does not enable multi-path transmission:

1. the terminal UE does not support multi-path transmission;
2. only one transmission path meeting UE service quality exists between the UE and the anchor; and
3. resources between the anchor and the core network are insufficient and cannot support multi-path transmission between the UE and the anchor.

In the following cases, the terminal UE may enable multi-path transmission:

1. the terminal UE supports multi-path transmission;
2. multiple transmission paths meeting UE service quality exist between the UE and the anchor;
3. all services requested by the UE cannot be transmitted by using a resource of any single transmission path between the UE and the anchor, but need to be transmitted by using multiple transmission paths; and
4. resources between the anchor and the core network are sufficient and can support multi-path transmission between the UE and the anchor.

When enabling multi-stream data transmission, the anchor may select some data transmission paths for multi-stream transmission of data. In this embodiment of the present application, the anchor may support the following multi-stream aggregation transmission schemes according to a UE service request and the resource availability:

1. UE-access node-wireless backhaul link-anchor, where there may be multiple wireless backhaul links; and
2. UE-access node-wireless backhaul link-anchor+UE-anchor air interface access link-anchor, where there may also be multiple wireless backhaul links.

It can be learned that no matter which multi-stream aggregation transmission scheme is used, because there is usually only one data transmission path UE-anchor air interface access link-anchor, the data transmission path UE-access node-wireless backhaul link-anchor is a necessary data transmission path in a multi-stream data transmission process.

It should be noted that the multiple target data transmission paths refer to paths by using which multi-stream data transmission is performed in this embodiment of the present application. Because the data transmission path UE-access node-wireless backhaul link-anchor is the necessary data transmission path in the multi-stream data transmission process, the multiple target data transmission paths definitely include the corresponding wireless backhaul link that is established between the target access node and the anchor by using the wireless backhaul device. The wireless backhaul link between the target access node and the anchor and a data link between the target access node and the UE form a complete data transmission path. The target access node is an access node that is in the at least one access node and that transmits the service data, that is, an access node selected for multi-stream data transmission in this embodiment of the present application. The target access node may be a selected target base station and/or a target WiFi AP.

Step S120: The target access node sends the service data to the UE by using the corresponding wireless backhaul link.

Optionally, if the data transmission path UE-anchor air interface access link-anchor is not used for multi-stream data transmission in this embodiment of the present application, multiple data transmission paths UE-access node-wireless backhaul link-anchor that are to be used exist. In this embodiment of the present application, the service data may be sent to the UE only by the target access node by using the corresponding wireless backhaul link.

Optionally, if the data transmission path UE-anchor air interface access link-anchor is used for multi-stream data transmission in this embodiment of the present application, the service data is allocated to the data transmission path UE-access node-wireless backhaul link-anchor and the data transmission path UE-anchor air interface access link-anchor for transmission. In this embodiment of the present application, not only the target access node sends some service data to the UE by using the corresponding wireless backhaul link, but the anchor also directly transmits some service data to the UE by using the anchor air interface access link.

Optionally, the UE may obtain the service data by using multiple data transmission paths UE-access node-wireless backhaul link-anchor, or may obtain the service data jointly by using at least one data transmission path UE-access node-wireless backhaul link-anchor and the data transmission path UE-anchor air interface access link-anchor.

The multi-stream data transmission method provided in this embodiment of the present application is based on a macro-micro integrated network. Data transmission is performed between each access node and an anchor by using a wireless backhaul link established by using a wireless backhaul device; during multi-stream data transmission, the anchor may obtain resource availability data of all data transmission paths from the UE to the anchor, where the resource availability data includes resource data of wireless backhaul links between all access nodes and the anchor; the anchor may determine multiple target data transmission paths according to the resource availability data of all the data transmission paths, and transmit service data to the UE in a multi-stream manner by using the multiple target data transmission paths, where the multiple target data transmission paths include a corresponding wireless backhaul link that is established between a target access node and the anchor by using a wireless backhaul device, and the target access node is an access node that is in the at least one access node and that transmits the service data; and the target access node further sends the service data to the UE by using the corresponding wireless backhaul link, so that the UE obtains the service data by using multiple target data transmission paths. In the multi-stream data transmission method provided in this embodiment of the present application, resource data of a wireless backhaul link between each access node and the anchor is taken into consideration as a basis for selecting a target data transmission path. In this way, neglect of resource availability of a wireless backhaul link on a base station or WiFi AP side in the prior art no longer exists, thereby ensuring a rate of multi-stream data transmission. In this embodiment of the present application, in a macro-micro integrated networking architecture, dynamic multi-stream transmission is implemented with reference to a backhaul resource, and user service experience of high-speed and high-quality multi-stream data transmission is provided. In addition, utilization of a wireless access resource and a backhaul resource is maximized, congestion and a packet loss caused due to lack of backhaul resources are avoided, and a waste of a wireless resource on an access side is avoided.

Optionally, described above is multi-stream data transmission in the direction from the anchor to the UE, with the distribution point of the multi-stream data transmission at the anchor, and the aggregation point at the UE. This embodiment of the present application may further support multi-stream data transmission in the direction from the UE to the anchor, with the distribution point of the multi-stream data transmission at the UE, and the aggregation point at the anchor. Correspondingly, the UE may transmit the service data to the anchor by using the multiple target data transmission paths, and the multiple target data transmission paths include the corresponding wireless backhaul link that is established between the target access node and the anchor by using the wireless backhaul device. Correspondingly, the anchor may receive, by using the multiple target data transmission paths, the service data sent by the UE, and the multiple target data transmission paths include the corresponding wireless backhaul link that is established between the target access node and the anchor by using the wireless backhaul device.

Optionally, in this embodiment of the present application, after receiving data of the core network, the anchor may perform traffic distribution for the data at an IP layer, and distribute IP data packets to different transmission paths. A specific transmission path is determined according to the foregoing method. After receiving data streams from the multiple transmission paths, the UE aggregates the data streams and then transfers an aggregated data stream to an application layer. Likewise, multi-path traffic distribution is performed at the IP layer for a data stream generated at the application layer of the UE, and IP data packets are distributed to different transmission paths for transmission. After being transmitted to the anchor by using the multiple transmission paths, data streams are aggregated at the IP layer and then sent to the core network.

In a traffic distribution and aggregation process of an IP data stream on an anchor side, the anchor supports identification of a user IP data stream, and distributes user IP data packets to different transmission paths for transmission. Traffic distribution of a user IP data stream on a terminal UE side may be implemented by installing an application program; or traffic distribution and aggregation of a user IP data packet are implemented by modifying an operating system.

Figure 5:
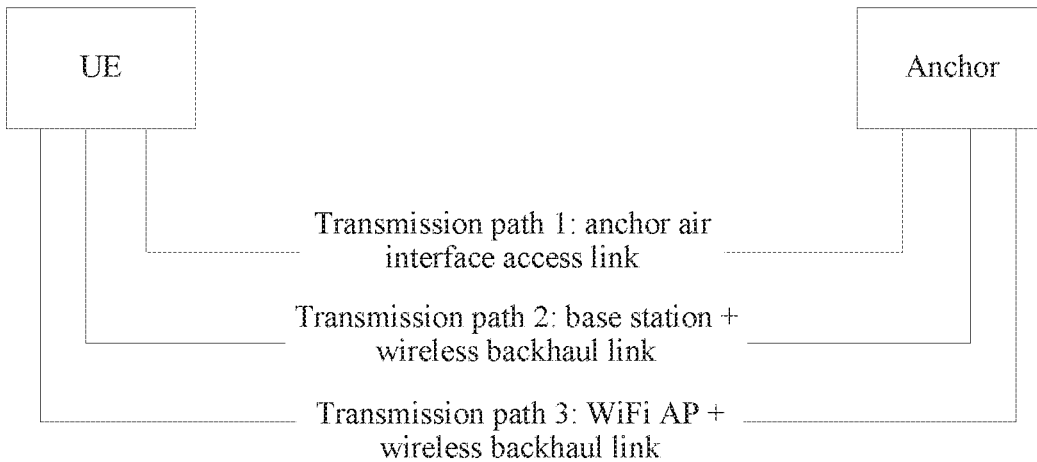
FIG. 5 is a schematic diagram of multi-stream data transmission according to an embodiment of the present application.

Optionally, in traffic distribution and aggregation of an IP layer data packet, transmission paths of the IP data packet may be determined according to resource availability, including information such as bandwidth, delay, a packet loss rate, and jitter, of the multiple available transmission paths. Details are as follows:

In this embodiment of the present application, when resources of each target data transmission path is greater than a specified value, data packets may be preferably distributed to a transmission path with low resource consumption. When the resources of each target data transmission path is greater than the specified value, it indicates that all the target data transmission paths can ensure user service experience. In this embodiment of the present application, when all the target data transmission paths can ensure the user service experience, the data packets may be preferably distributed to the transmission path with low resource consumption. For example, the FIG. 5 shows a schematic diagram of multi-stream data transmission. Referring to FIG. 5, if a transmission path 1 and a transmission path 2 are selected during multi-path transmission to provide data transmission for a UE service, when the transmission path 1 and the transmission path 2 both can support same user service experience, user service data is preferably distributed to the transmission path 2 for transmission.

In this embodiment of the present application, when resources of a target data transmission path is less than a specified value, important high-priority data packets are distributed to a transmission path with relatively sufficient resources, and low-priority data packets are distributed to a transmission path with relatively strained resources. When the resources of the target data transmission path is less than the specified value, it indicates that resources of the transmission path are strained. In this embodiment of the present application, when the resources of the transmission path are strained, the important high-priority data packets are preferably distributed to a transmission path that can ensure quality, and the low-priority data packets are distributed to a transmission path that cannot ensure quality. For example, in FIG. 5, it is assumed that: a dedicated licensed spectrum is used for wireless backhaul of a base station, there are few spectrums, and small bandwidth can be provided, but quality can be ensured; while an unlicensed spectrum is used for wireless backhaul of a WiFi AP, there are many spectrums, and large peak bandwidth can be provided, but quality cannot be ensured. If the transmission path 2 and a transmission path 3 are selected during multi-path transmission to provide data transmission for the UE service, when traffic of the UE service is relatively large, high-priority data needs to be distributed to the transmission path 2 for transmission, and low-priority data is distributed to the transmission path 3 for transmission.

When an available resource of a transmission path can meet the UE service request, only one transmission path needs to be selected to transmit a service data stream of the UE.

If transmission resources between the anchor and the core network are not sufficient enough to support traffic of transmission of multiple data streams between the UE and the anchor, the multi-stream transmission scheme is not selected, and only one transmission path is selected to transmit UE data.

Optionally, when determining the target data transmission paths, the anchor may determine, according to a signal coverage area in which the UE is located, the resource data of the air interface access links between all the access nodes and the UE, the resource data of the wireless backhaul links between all the access nodes and the anchor, and the resource data of the anchor air interface access link between the UE and the anchor, that data transmission paths that are located in the signal coverage area and whose link resources (resource data of air interface access links in the signal coverage area or resources of wireless backhaul links in the signal coverage area) meet a predetermined condition are the target data transmission paths. An example in which an access node includes a base station and a WiFi AP is used for description below. There may be at least one base station, and there may also be at least one WIFI AP. The multiple target data transmission paths by using which multi-stream data transmission is performed according to this embodiment of the present application may include the following cases:

Case 1: Multi-stream transmission of "UE-base station-wireless backhaul link-anchor"+"UE-WiFi AP-wireless backhaul link-anchor".

Figure 6:
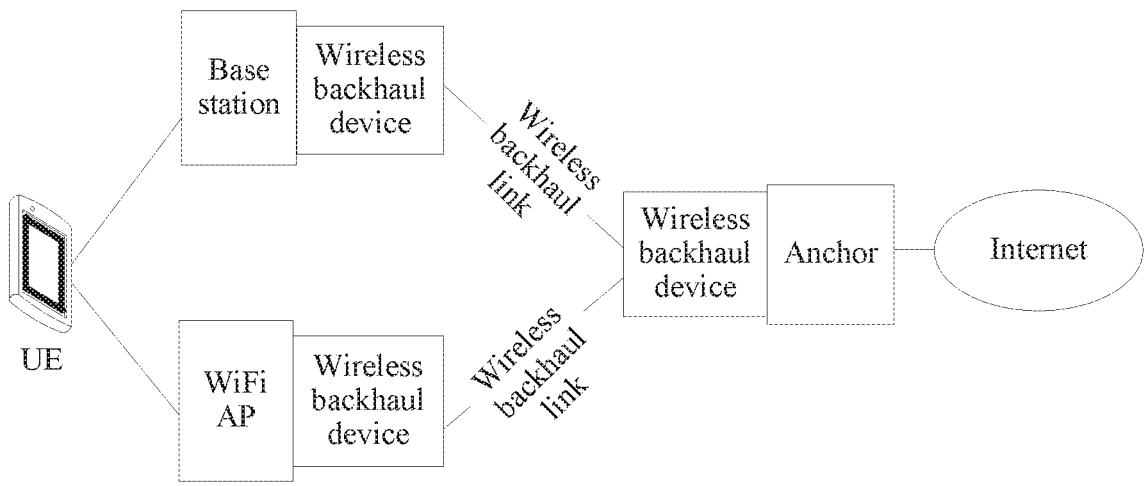
FIG. 6 is a schematic diagram of an architecture of a target data transmission path according to an embodiment of the present application.

Referring to FIG. 6, FIG. 6 shows an optional schematic diagram of an architecture of a target data transmission path. According to the conditions for selecting the target data transmission paths (the data transmission paths that are located in the signal coverage area and whose link resources meet the predetermined condition are determined as the target data transmission paths), in this embodiment of the present application, when the UE is in a coverage area of the base station and a coverage area of the WiFi AP, resources of an air interface access link are sufficient, resources of a wireless backhaul link between the base station and the anchor are sufficient, and resources of a wireless backhaul link between the WiFi AP and the anchor are sufficient, and when the UE requests a high-rate service, multi-stream transmission may be performed by using the data transmission paths shown in Case 1. FIG. 6 shows a schematic diagram of an architecture of a target data transmission path when a base station and a WiFi AP are separate devices. The base station and the WiFi AP are independent devices that are separated, and separately connect to the anchor by using their respective corresponding wireless backhaul links. The wireless backhaul link may be a point-to-multipoint transmission technology and is shared by the base station and the WiFi AP; or the wireless backhaul link may be a point-to-point transmission technology and is used to separately transmit a service flow of the base station and a service flow of the WiFi AP. In FIG. 6, a small cell and a WiFi AP share a point-to-multipoint wireless backhaul link.

Figure 7:
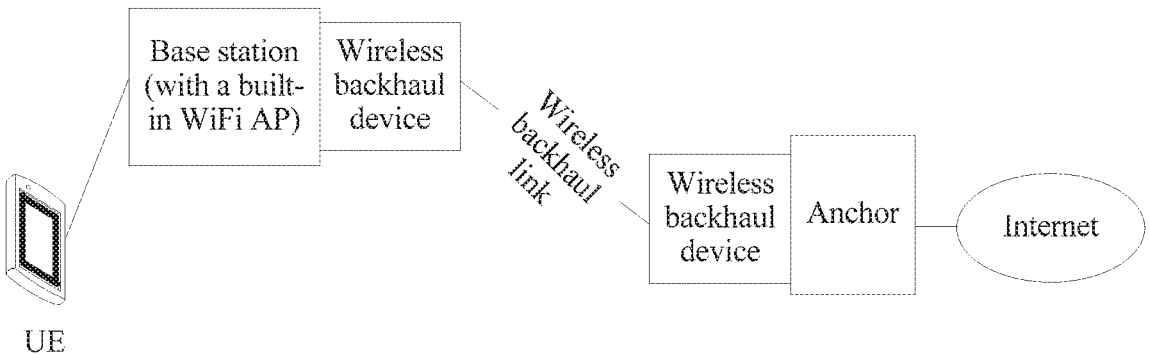
FIG. 7 is another schematic diagram of an architecture of a target data transmission path according to an embodiment of the present application.

Referring to FIG. 7, FIG. 7 shows another optional schematic diagram of an architecture of a target data transmission path. FIG. 7 shows a schematic diagram of an architecture of a target data transmission path when a base station and a WiFi AP are an integrated device. As shown in FIG. 7, a WiFi AP function is built in a base station device, that is, the base station and the WiFi AP are integrated and connect to the anchor by using a shared wireless backhaul link.

In this embodiment of the present application, the anchor is a decision control point of multi-stream transmission, and according to resource availability of an access link of the UE, resource availability of a wireless backhaul link, with reference to a resource required by the UE service request and transmission resource availability between the anchor and the core network, may dynamically control whether to use the multiple paths "UE-base station-wireless backhaul link-anchor"+"UE-WiFi AP-wireless backhaul link-anchor" to transmit the service data of the UE, so as to provide high-speed service flow data transmission for the UE. If a transmission path resource of "UE-base station-wireless backhaul link-anchor" or a transmission path resource of "UE-WiFi AP-wireless backhaul link-anchor" can meet a service requirement requested by the UE, the anchor may select, by means of control and decision, only "UE-base station-wireless backhaul link-anchor" to provide service transmission for the UE, or only "UE-WiFi AP-wireless backhaul link-anchor" to provide service transmission for the UE.

Optionally, wireless backhaul between the base station and the anchor or wireless backhaul between the WiFi AP and the anchor may be a physical link, or may be multiple physical links. When there are two physical links, the two physical links may include an unlicensed wireless backhaul link and a licensed wireless backhaul link. When the unlicensed wireless backhaul link and the licensed wireless backhaul link are used, resources of a wireless backhaul link may be more diversified, including not only a licensed transmission resource that ensures reliable quality, but also an unlicensed transmission resource that does not ensure quality. Therefore, when making a data transmission path selection decision and performing service scheduling, the anchor can perform more refined management. One of typical applications is: transmitting important high-priority data with a low bandwidth requirement preferably over the licensed backhaul link, while distributing medium or low-priority data with large traffic to the unlicensed backhaul link for transmission.

Case 2: Multi-stream transmission of multiple data transmission paths "UE-base station-wireless backhaul link-anchor". For example, when there are a base station 1 and a base station 2, "UE-base station 1-wireless backhaul link-anchor"+"UE-base station 2-wireless backhaul link-anchor" may be used to perform multi-stream transmission.

When the UE is located in a coverage area of the base station 1 and a coverage area of the base station 2, resources of an air interface access link between the UE and the base station 1 are sufficient, resources of an air interface access link between the UE and the base station 2 are sufficient, and resources of a wireless backhaul link between the base station 1 and the anchor and resources of a wireless backhaul link between the base station 2 and the anchor are sufficient, and when the UE requests a high-rate service, in this embodiment of the present application, multi-stream transmission may be performed by using the data transmission paths "UE-base station 1-wireless backhaul link-anchor"+"UE-base station 2-wireless backhaul link-anchor".

Figure 8:
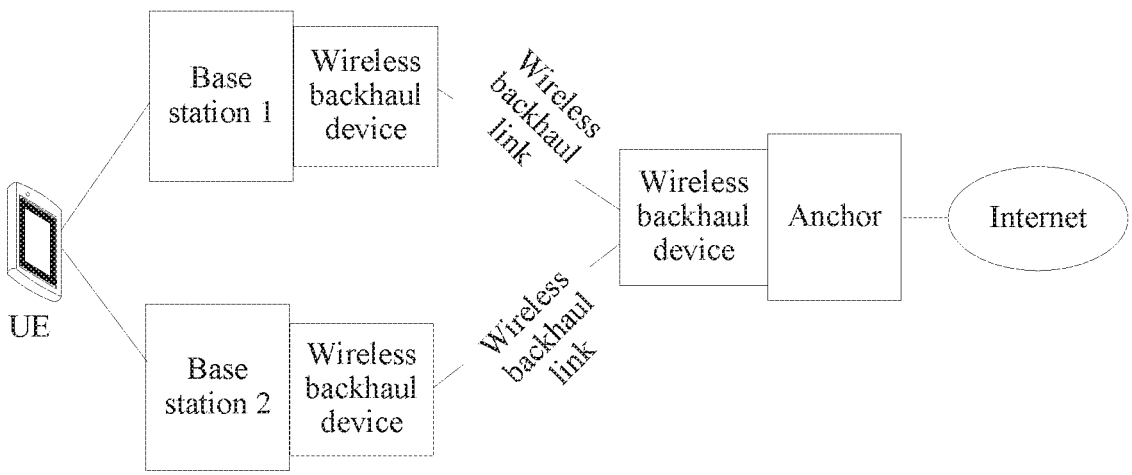
FIG. 8 is still another schematic diagram of an architecture of a target data transmission path according to an embodiment of the present application.
Figure 9:
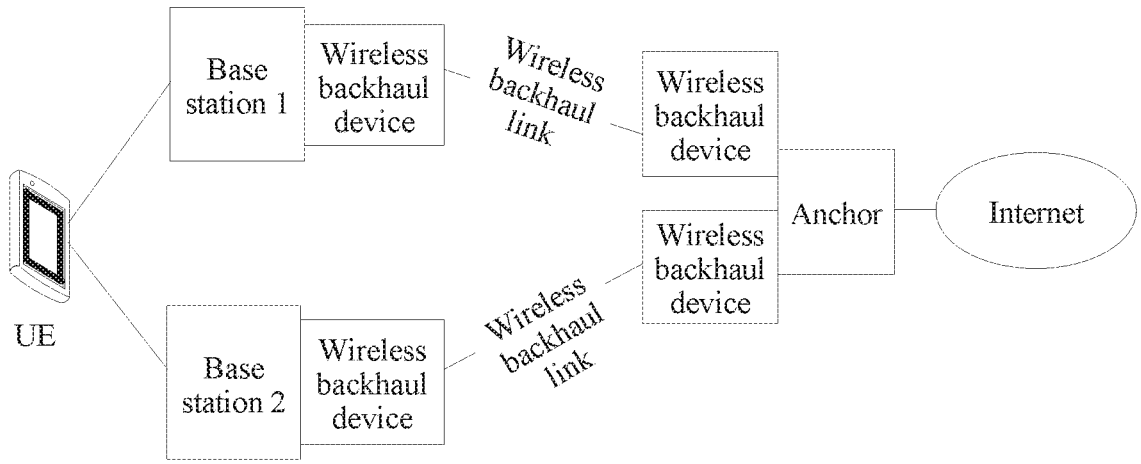
FIG. 9 is yet another schematic diagram of an architecture of a target data transmission path according to an embodiment of the present application.

Referring to FIG. 8, FIG. 8 shows still another optional schematic diagram of an architecture of a target data transmission path. In FIG. 8, the base station 1 and the base station 2 share a same point-to-multipoint wireless backhaul link, and establish a transmission connection to the anchor. Referring to FIG. 9, FIG. 9 shows yet another optional schematic diagram of an architecture of a target data transmission path. In FIG. 9, the base station 1 and the base station 2 use separate point-to-point wireless backhaul links, and separately establish a transmission connection to the anchor. Likewise, the wireless backhaul link between the base station 1 and the anchor or the wireless backhaul link between the base station 2 and the anchor may also be a multi-channel link, for example, may be an unlicensed wireless backhaul link and a licensed wireless backhaul link, or two licensed wireless backhaul channels.

In this embodiment of the present application, the anchor is a decision control point of multi-stream transmission for the UE and dynamically controls whether to use multiple paths such as "UE-base station 1-wireless backhaul link-anchor" and "UE-base station 2-wireless backhaul link-anchor" to transmit service flow data of the UE, so as to provide high-speed user service experience. If a transmission path resource of "UE-base station 1-wireless backhaul link-anchor" or a transmission path resource of "UE-base station 2-wireless backhaul link-anchor" can provide a service requirement requested by the UE, the anchor may select only the transmission path "UE-base station 1-wireless backhaul link-anchor" to transmit a UE service, or select only the transmission path "UE-base station 2-wireless backhaul link-anchor" to transmit a UE service.

Apparently, in this embodiment of the present application, although an example in which a quantity of base stations is 2 is used for description that multi-stream data transmission is performed by using multiple data transmission paths "UE-base station-wireless backhaul link-anchor", a value of the quantity of base stations may be determined according to an actual situation. A description in which the quantity of the base stations is two (the base station 1 and the base station 2) is merely an optional manner for ease of understanding the description described in which multi-stream data transmission is performed by using multiple data transmission paths "UE-base station-wireless backhaul link-anchor" in this embodiment of the present application.

Case 3: Multi-stream transmission of "UE-base station-wireless backhaul link-anchor"+"UE-WiFi AP-wireless backhaul link-anchor"+"UE-anchor air interface access link-anchor". There are at least one data transmission path "UE-base station-wireless backhaul link-anchor", and there is at least one data transmission path "UE-WiFi AP-wireless backhaul link-anchor".

When the UE is in a coverage area of the anchor, a coverage area of a small cell, and a coverage area of the WiFi AP, and a resource of any one of the transmission paths "UE-base station-wireless backhaul link-anchor", "UE-WiFi AP-wireless backhaul link-anchor", and "UE-anchor air interface access link-anchor" cannot meet transmission of a service requested by the UE, the anchor may dynamically control, according to resource information on all transmission paths, whether to use multi-path transmission and which transmission paths are used to provide service transmission for the UE. In this embodiment of the present application, when all the transmission paths have few resources, multi-stream data transmission is performed with reference to "UE-base station-wireless backhaul link-anchor", "UE-WiFi AP-wireless backhaul link-anchor", and "UE-anchor air interface access link-anchor".

Figure 10:
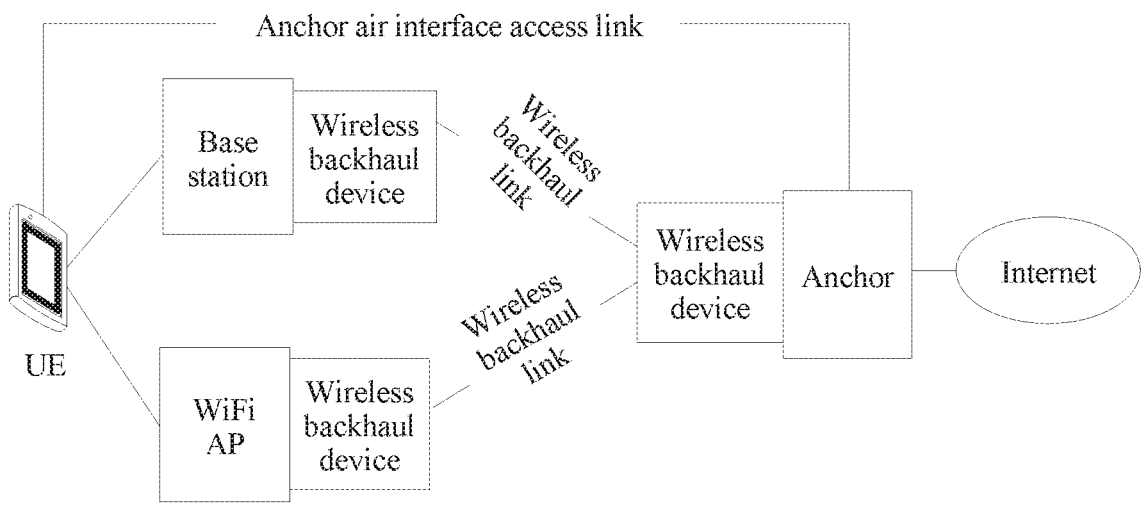
FIG. 10 is still yet another schematic diagram of an architecture of a target data transmission path according to an embodiment of the present application.

Referring to FIG. 10, FIG. 10 is still yet another optional schematic diagram of an architecture of a target data transmission path. FIG. 10 shows multi-stream transmission networking provided for the UE by using three transmission paths "UE-base station-wireless backhaul link-anchor", "UE-WiFi AP-wireless backhaul link-anchor", and "UE-anchor air interface access link-anchor".

Figure 11:
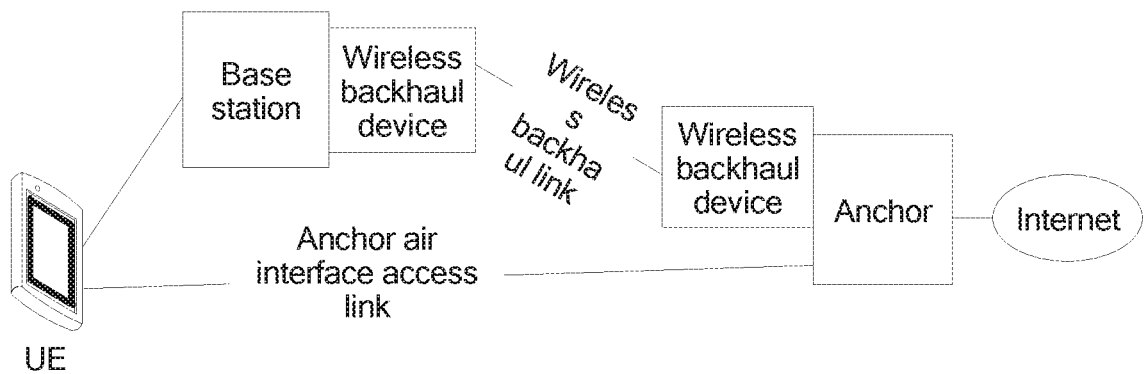
FIG. 11 is an even yet another schematic diagram of an architecture of a target data transmission path according to an embodiment of the present application.
Figure 12:
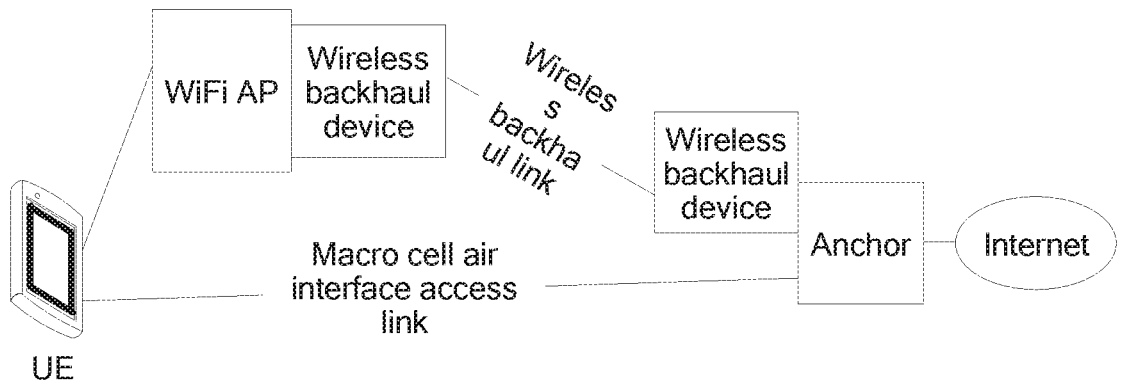
FIG. 12 is an even yet another schematic diagram of an architecture of a target data transmission path according to an embodiment of the present application.

Apparently, in addition to the foregoing three cases, other data transmission paths may further be used to perform multi-stream data transmission in this embodiment of the present application. FIG. 11 shows an even yet another optional schematic diagram of an architecture of a target data transmission path, and FIG. 12 shows an even yet another optional schematic diagram of an architecture of a target data transmission path. FIG. 11 shows multi-stream transmission networking provided for the UE by using "UE-anchor air interface access link-anchor"+"UE-base station-wireless backhaul link-anchor"; and FIG. 12 shows multi-stream transmission networking provided for the UE by using "UE-anchor air interface access link-anchor"+"UE-WiFi AP-wireless backhaul link-anchor". It should be noted that wireless backhaul shown in FIG. 10 to FIG. 12 is a point-to-multipoint transmission technology, and the base station and the WiFi AP have only one backhaul link. In actual networking, a point-to-point transmission technology may be used, and there may be multiple backhaul links.

Optionally, the resource availability data that is of all the data transmission paths from the UE to the anchor and that is obtained by the anchor may include: the resource data of the air interface access links between all the access nodes and the UE, the resource data of the wireless backhaul links between all the access nodes and the anchor, and the resource data of the anchor air interface access link between the UE and the anchor.

Optionally, in this embodiment of the present application, after dynamically detecting the resource data of the air interface access links between the access nodes and the UE in real time and preprocessing the detected resource data, all the access nodes may report processed link resource data to the anchor. Resource data of an air interface access link may include resource data such as available bandwidth and a congestion status of the access link. Correspondingly, when the access node is a base station, after dynamically detecting resource data of an air interface access link between the UE and the base station in real time and preprocessing the detected resource data, the base station may report resource data of the air interface access link, such as available bandwidth and a congestion status of the access link, to the decision point anchor in real time. Correspondingly, when the access node is a WiFi AP, after dynamically detecting resource data of an air interface access link between the UE and the WiFi AP in real time and preprocessing the detected resource data, the WiFi AP may report resource data of the air interface access link, such as available bandwidth and a congestion status of the access link, to the decision point anchor in real time.

Optionally, in this embodiment of the present application, the resource data of the wireless backhaul links between all the access nodes and the anchor may be obtained by using multiple manners. A manner is as follows: After dynamically detecting a status of a corresponding wireless backhaul link, and processing a detection result, the wireless backhaul device reports resource data such as available bandwidth, link quality (such as available bandwidth, a delay, jitter, and a packet loss) to the anchor. Another manner is as follows: After the access node (the base station or the WiFi AP) and the anchor detect a resource status of the wireless backhaul link between the access node and the anchor and preprocess a detection result, the anchor may obtain preprocessed resource data, such as available bandwidth, link quality (such as available bandwidth, a delay, jitter, and a packet loss).

Optionally, for a networking case in which the base station and the anchor or the WiFi AP and the anchor share a wireless backhaul link, the anchor needs to comprehensively consider a detection result of a wireless backhaul resource between the base station and the anchor or between the WiFi AP and the anchor, so as to accurately obtain resource information such as available bandwidth.

Optionally, in this embodiment of the present application, the anchor may detect a resource status of the air interface access link between the UE and the anchor in real time, after processed, and then obtain resource information such as available bandwidth and a congestion status, so as to obtain resource data of the anchor air interface access link between the UE and the anchor.

The anchor gathers the resource information of the foregoing transmission paths, and then can obtain the resource availability data of all the transmission paths between the UE and the anchor. For example, with reference to a resource of an air interface access link between the UE and the base station and a resource of a wireless backhaul link between the base station and the anchor, an available resource, such as available bandwidth, of the transmission path "UE-base station-wireless backhaul link-anchor". Likewise, a resource status of another transmission path may be obtained.

The multi-stream data transmission method provided in this embodiment of the present application has the following advantages:

In the macro-micro integrated networking architecture, dynamic multi-stream transmission is implemented with reference to a backhaul resource, high-speed and high-quality multi-stream data transmission is provided, and user service experience is improved.

Utilization of a wireless access resource and a backhaul resource is maximized, congestion and a packet loss caused due to lack of backhaul resources are avoided, and a waste of a wireless resource on an access side is avoided.

In a direction from an anchor to UE, a wireless backhaul link can distinguish between WLAN service data and cellular service data, thereby implementing refined management of a wireless backhaul resource.

In a direction from an anchor to UE, an anchor is used as a service centralized control point and may dynamically implement traffic control or dynamically select a multi-stream transmission scheme according to resource availability of a wireless backhaul link, thereby avoiding impact brought by congestion and a packet loss of the wireless backhaul link on user service experience.

The following describes a multi-stream data transmission method provided in an embodiment of the present application from the perspective of an anchor. The multi-stream data transmission method described below and the foregoing multi-stream data transmission method described from the perspective of a macro-micro integrated network may be mutually referenced.

Figure 13:
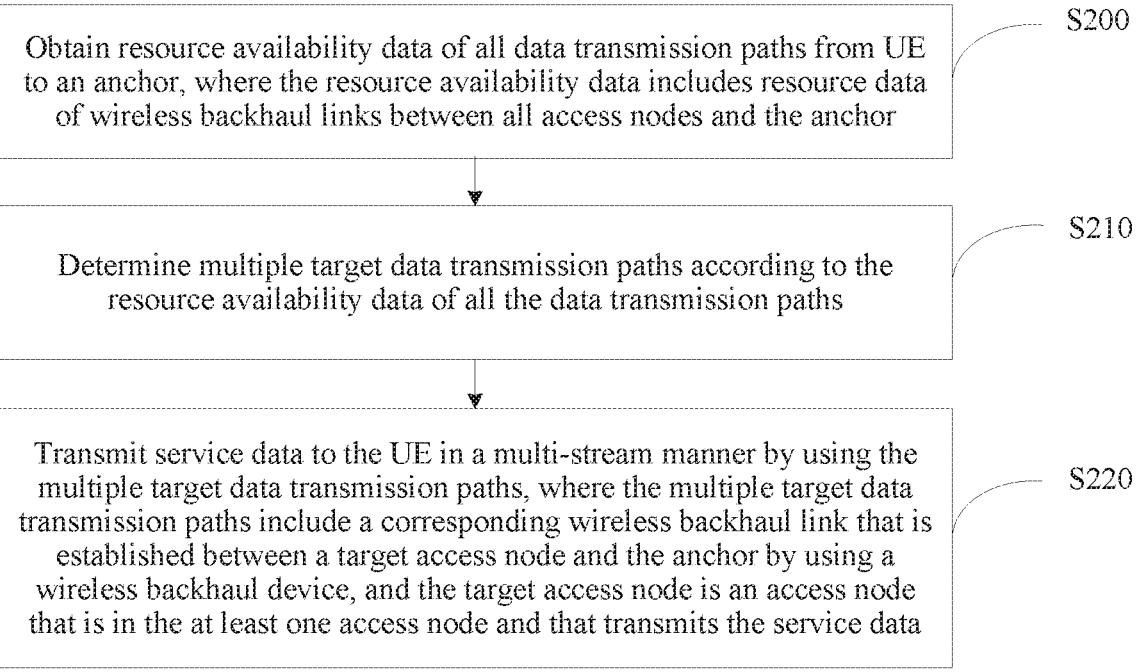
FIG. 13 is another flowchart of a multi-stream data transmission method according to an embodiment of the present application.

FIG. 13 is another flowchart of a multi-stream data transmission method according to an embodiment of the present application. The method is based on a macro-micro integrated network and is applied to an anchor. Referring to FIG. 13, the method may include the following steps.

Step S200: Obtain resource availability data of all data transmission paths from the UE to the anchor, where the resource availability data includes resource data of wireless backhaul links between all access nodes and the anchor.

Optionally, the data transmission paths between the UE and the anchor include: 1. UE-access node-wireless backhaul link-anchor; and 2. UE-anchor air interface access link-anchor; and the resource availability data of all the data transmission paths may include: resource data of air interface access links between all the access nodes and the UE, the resource data of the wireless backhaul links between all the access nodes and the anchor, and resource data of an anchor air interface access link between the UE and the anchor.

A manner of obtaining the resource data of the air interface access links between all the access nodes and the UE may be as follows: after all the access nodes dynamically detect the resource data of the air interface access links between the access nodes and the UE in real time and preprocess the detected resource data of the air interface access links, obtaining preprocessed resource data that is of the air interface access links and that is uploaded by all the access nodes.

A manner of obtaining the resource data of the wireless backhaul links between all the access nodes and the anchor may be as follows: after a wireless backhaul device dynamically detects resource data of a corresponding wireless backhaul link and preprocesses the detected resource data, obtaining preprocessed resource data uploaded by the wireless backhaul device; or when an access node and the anchor detect resource data of a wireless backhaul link between the access node and the anchor, obtaining the detected preprocessed resource data.

A manner of obtaining the resource data of the anchor air interface access link between the UE and the anchor may be as follows: after the anchor detects the resource data of the air interface access link between the UE and the anchor in real time, obtaining the detected resource data of the air interface access link between the UE and the anchor.

Step S210: Determine multiple target data transmission paths according to the resource availability data of all the data transmission paths.

Optionally, in this embodiment of the present application, it may be determined, according to a signal coverage area in which the UE is located, the resource data of the air interface access links between all the access nodes and the UE, the resource data of the wireless backhaul links between all the access nodes and the anchor, and the resource data of the anchor air interface access link between the UE and the anchor, that data transmission paths that are located in the signal coverage area and whose link resources meet a predetermined condition are the target data transmission paths. Specifically, specific conditions for determining the target data transmission paths in various cases are described above and may be referenced.

Step S220: Transmit service data to the UE in a multi-stream manner by using the multiple target data transmission paths, where the multiple target data transmission paths include a corresponding wireless backhaul link that is established between a target access node and the anchor by using a wireless backhaul device, and the target access node is an access node that is in the at least one access node and that transmits the service data.

Optionally, in this embodiment of the present application, when resources of each target data transmission path is greater than a specified value, data packets of the service data are distributed to a transmission path with low resource consumption; or when resources of a target data transmission path is less than the specified value, important high-priority data packets are distributed to a transmission path with relatively sufficient resources, and low-priority data packets are distributed to a transmission path with relatively strained resources.

Optionally, in addition to the corresponding wireless backhaul link that is established between the target access node and the anchor by using the wireless backhaul device, the target data transmission paths may further include the anchor air interface access link between the UE and the anchor.

Optionally, the corresponding wireless backhaul link that is established between the target access node and the anchor by using the wireless backhaul device may include: at least one wireless backhaul link that is established between abase station and the anchor by using a wireless backhaul device; and/or at least one wireless backhaul link that is established between a WIFI AP and the anchor by using a wireless backhaul device. Correspondingly, specific cases are described above and may be referenced, and details are not described herein.

Optionally, in this embodiment of the present application, whether to enable multi-stream data transmission may be determined before the multiple target data transmission paths are determined. Specifically, in this embodiment of the present application, whether to enable multi-stream data transmission is determined according to a type of a service requested by the UE, whether the UE supports multi-stream transmission, a quantity of transmission paths between the UE and the anchor, resource availability on the multiple transmission paths between the UE and the anchor, and resource availability between the anchor and a core network; and when the type of the service requested by the UE requires multi-path transmission, the UE supports multi-path transmission, multiple transmission paths exist between the UE and the anchor, the resource availability on the multiple transmission paths between the UE and the anchor matches multi-path transmission, and the resource availability between the anchor and the core network matches multi-path transmission, multi-stream data transmission is used, so as to determine the multiple target data transmission paths after multi-stream data transmission is enabled.

Figure 14:
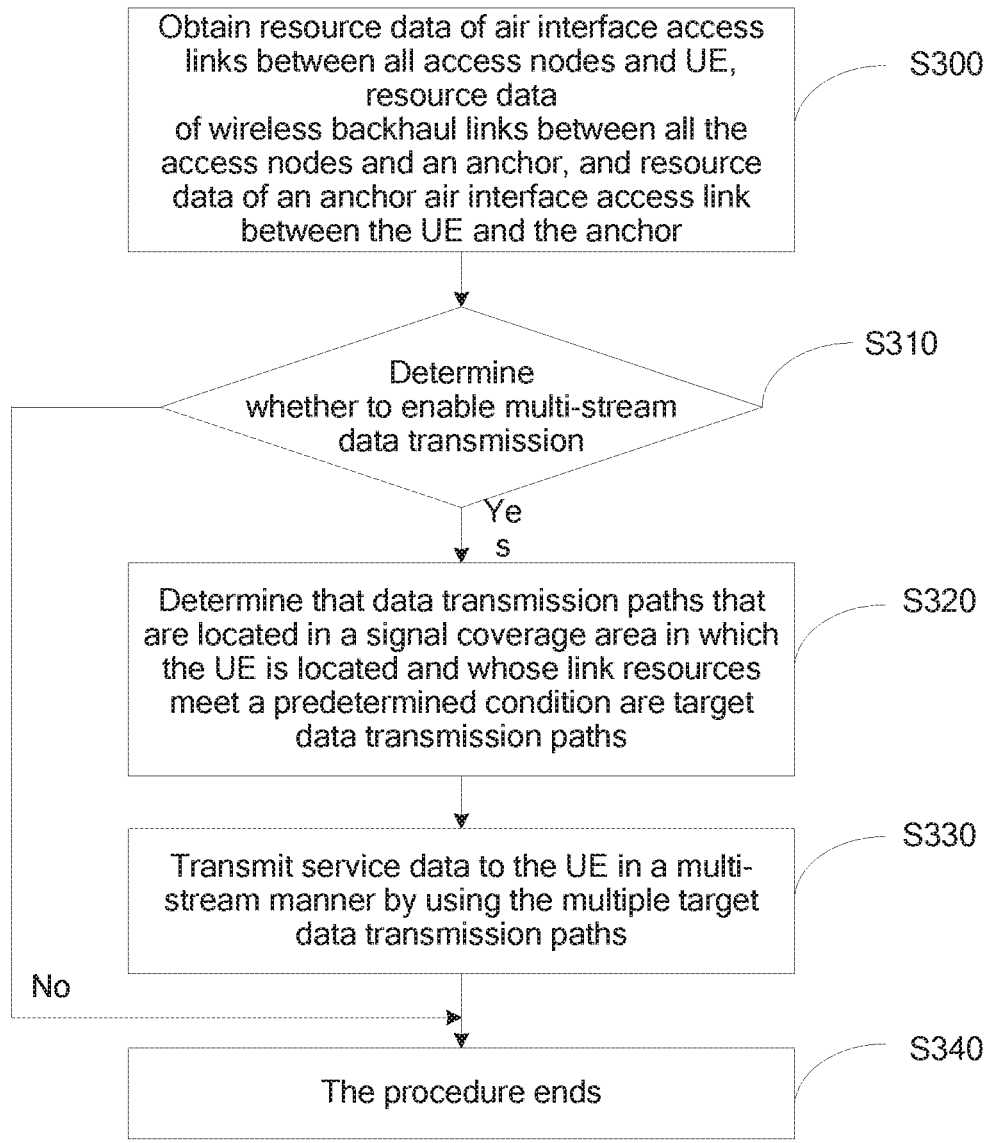
FIG. 14 is still another flowchart of a multi-stream data transmission method according to an embodiment of the present application.

Optionally, FIG. 14 shows still another flowchart of a multi-stream data transmission method according to an embodiment of the present application. Referring to FIG. 14, the method may include the following steps:

Step S300: Obtain resource data of air interface access links between all access nodes and UE, resource data of wireless backhaul links between all the access nodes and an anchor, and resource data of an anchor air interface access link between the UE and the anchor.

Step S310: Determine whether to enable multi-stream data transmission; if yes, perform step S320; or if no, perform step S340.

Step S320: Determine that data transmission paths that are located in a signal coverage area in which the UE is located and whose link resources meet a predetermined condition are the target data transmission paths.

Step S330: Transmit service data to the UE in a multi-stream manner by using the multiple target data transmission paths.

Step S340: The procedure ends.

Optionally, the UE may transmit the service data to the anchor by using the multiple target data transmission paths, and the multiple target data transmission paths include the corresponding wireless backhaul link that is established between the target access node and the anchor by using the wireless backhaul device. Correspondingly, the anchor may receive, by using the multiple target data transmission paths, the service data sent by the UE, and the multiple target data transmission paths include the corresponding wireless backhaul link that is established between the target access node and the anchor by using the wireless backhaul device.

According to the multi-stream data transmission method provided in this embodiment of the present application, in a macro-micro integrated networking architecture, dynamic multi-stream transmission is implemented with reference to a backhaul resource, and user service experience of high-speed and high-quality multi-stream data transmission is provided. In addition, utilization of a wireless access resource and a backhaul resource is maximized, congestion and a packet loss caused due to lack of backhaul resources are avoided, and a waste of a wireless resource on an access side is avoided.

The following describes a multi-stream data transmission apparatus provided in an embodiment of the present application. The multi-stream data transmission apparatus described below and the multi-stream data transmission method described above from the perspective of an anchor may be mutually referenced.

Figure 15:
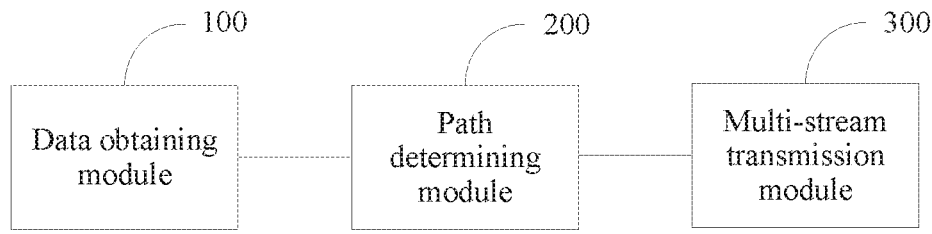
FIG. 15 is a structural block diagram of a multi-stream data transmission apparatus according to an embodiment of the present application.

FIG. 15 is a structural block diagram of a multi-stream data transmission apparatus according to an embodiment of the present application. The apparatus is based on a macro-micro integrated network and is applied to an anchor. Referring to FIG. 15, the multi-stream data transmission apparatus may include:

a data obtaining module 100, configured to obtain resource availability data of all data transmission paths from the UE to the anchor, where the resource availability data includes resource data of wireless backhaul links between all access nodes and the anchor;

a path determining module 200, configured to determine multiple target data transmission paths according to the resource availability data of all the data transmission paths; and a multi-stream transmission module 300, configured to transmit service data to the UE in a multi-stream manner by using the multiple target data transmission paths, where the multiple target data transmission paths include a corresponding wireless backhaul link that is established between a target access node and the anchor by using a wireless backhaul device, and the target access node is an access node that is in the at least one access node and that transmits the service data.

Optionally, in addition to the corresponding wireless backhaul link that is established between the target access node and the anchor by using the wireless backhaul device, the target data transmission paths may further include the anchor air interface access link between the UE and the anchor.

Optionally, the corresponding wireless backhaul link that is established between the target access node and the anchor by using the wireless backhaul device may include: at least one wireless backhaul link that is established between a base station and the anchor by using a wireless backhaul device; and/or at least one wireless backhaul link that is established between a WIFI AP and the anchor by using a wireless backhaul device. Correspondingly, specific cases are described above and may be referenced, and details are not described herein.

Figure 16:
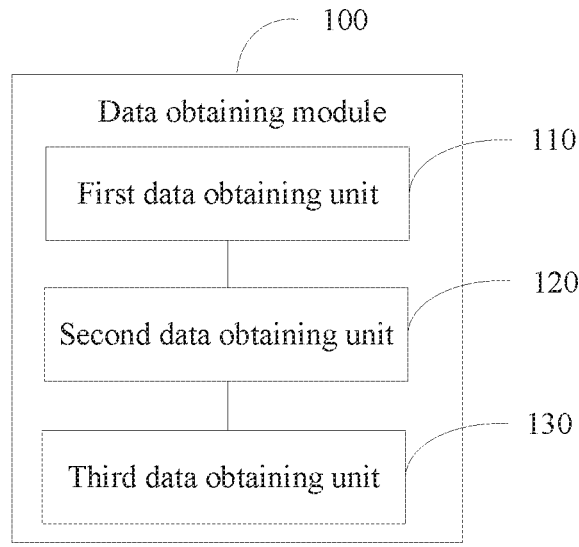
FIG. 16 is a structural block diagram of a data obtaining module according to an embodiment of the present application.

Optionally, FIG. 16 shows an optional structure of the data obtaining module 100. Referring to FIG. 16, the data obtaining module 100 may include a first data obtaining unit 110, a second data obtaining unit 120, and a third data obtaining unit 130.

The first data obtaining unit 110 is configured to obtain resource data of air interface access links between all the access nodes and the UE.

Optionally, after all the access nodes dynamically detect the resource data of the air interface access links between the access nodes and the UE in real time and preprocesses the detected resource data of the air interface access links, the anchor may obtain preprocessed resource data that is of the air interface access links and that is uploaded by all the access nodes.

A second data obtaining unit 120 is configured to obtain the resource data of the wireless backhaul links between all the access nodes and the anchor.

Optionally, after a wireless backhaul device dynamically detects resource data of a corresponding wireless backhaul link and preprocesses the detected resource data, the anchor may obtain preprocessed resource data uploaded by the wireless backhaul device; or when an access node and the anchor detect resource data of a wireless backhaul link between the access node and the anchor, the anchor may obtain the detected preprocessed resource data.

A third data obtaining unit 130 is configured to obtain resource data of an anchor air interface access link between the UE and the anchor.

Optionally, the first data obtaining unit may use a first obtaining execution subunit, configured to: after all the access nodes dynamically detect the resource data of the air interface access links between the access nodes and the UE in real time and preprocesses the detected resource data of the air interface access links, obtain preprocessed resource data that is of the air interface access links and that is uploaded by all the access nodes.

The second data obtaining unit may use a second obtaining execution subunit, configured to: after a wireless backhaul device dynamically detects resource data of a corresponding wireless backhaul link and preprocesses the detected resource data, obtain preprocessed resource data uploaded by the wireless backhaul device; or when an access node and the anchor detect resource data of a wireless backhaul link between the access node and the anchor, obtain the detected preprocessed resource data.

The third data obtaining unit may use a third obtaining execution subunit, configured to: after the anchor detects the resource data of the air interface access link between the UE and the anchor in real time, obtain the detected resource data of the air interface access link between the UE and the anchor.

Figure 17:
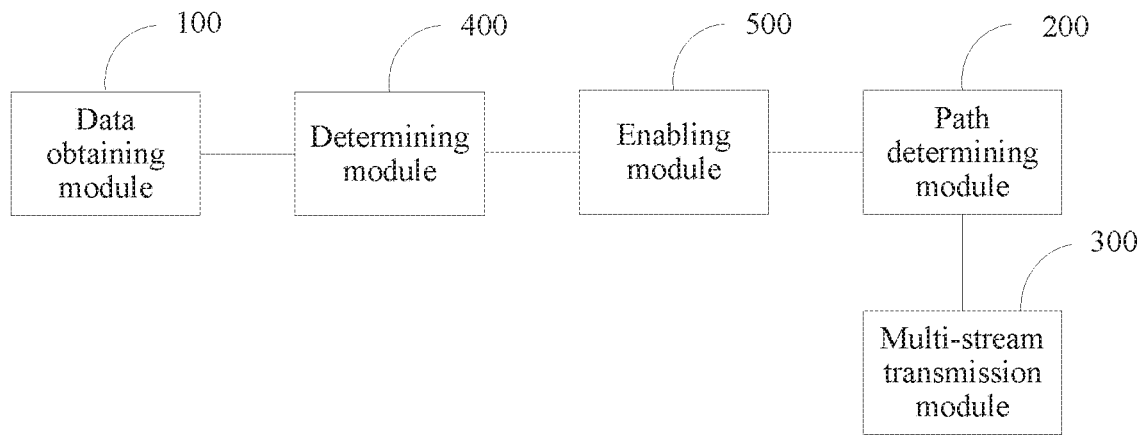
FIG. 17 is another structural block diagram of a multi-stream data transmission apparatus according to an embodiment of the present application.

Optionally, FIG. 17 shows another structural block diagram of a multi-stream data transmission apparatus according to an embodiment of the present application. With reference to FIG. 15 and FIG. 17, the multi-stream data transmission apparatus may further include:

a determining module 400, configured to determine, according to a type of a service requested by the UE, whether the UE supports multi-stream transmission, a quantity of transmission paths between the UE and the anchor, resource availability on multiple transmission paths between the UE and the anchor, and resource availability between the anchor and a core network, whether to enable multi-stream data transmission; and an enabling module 500, configured to: when the type of the service requested by the UE requires multi-path transmission, the UE supports multi-path transmission, multiple transmission paths exist between the UE and the anchor, the resource availability on the multiple transmission paths between the UE and the anchor matches multi-path transmission, and the resource availability between the anchor and the core network matches multi-path transmission, enable multi-stream data transmission, so as to determine the multiple target data transmission paths after multi-stream data transmission is enabled.

Figure 18:
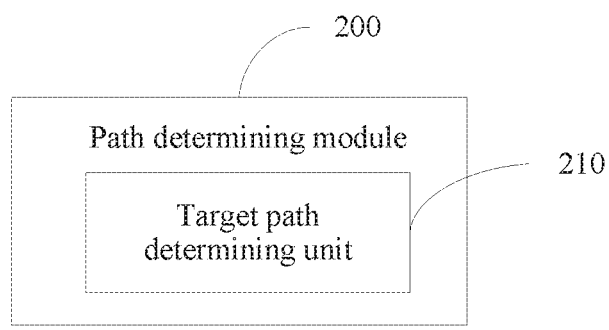
FIG. 18 is a structural block diagram of a path determining module according to an embodiment of the present application.

Optionally, FIG. 18 shows an optional structure of a path determining module 200 according to an embodiment of the present application. Referring to FIG. 18, the path determining module 200 may include:

a target path determining unit 210, configured to: determine, according to a signal coverage area in which the UE is located, resource data of air interface access links between all the access nodes and the UE, the resource data of the wireless backhaul links between all the access nodes and the anchor, and resource data of an anchor air interface access link between the UE and the anchor, that data transmission paths that are located in the signal coverage area and whose link resources meet a predetermined condition are the target data transmission paths.

Figure 19:
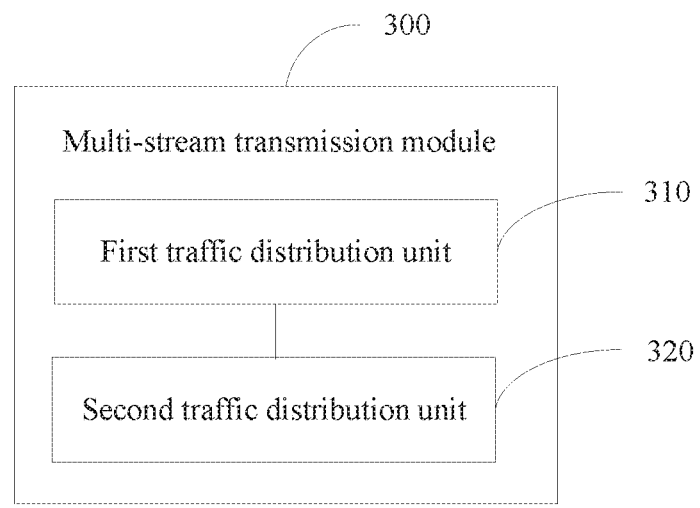
FIG. 19 is a structural block diagram of a multi-stream transmission module according to an embodiment of the present application.

Optionally, FIG. 19 shows an optional structure of the multi-stream transmission module 300. Referring to FIG. 19, the multi-stream transmission module 300 may include:

a first traffic distribution unit 310, configured to: when resources of each target data transmission path is greater than a specified value, distribute data packets of the service data to a transmission path with low resource consumption; and a second traffic distribution unit 320, configured to: when resources of a target data transmission path is less than the specified value, distribute high-priority data packets to a transmission path with relatively sufficient resources, and distribute low-priority data packets to a transmission path with relatively strained resources.

According to the multi-stream data transmission apparatus provided in this embodiment of the present application, in a macro-micro integrated networking architecture, dynamic multi-stream transmission is implemented with reference to a backhaul resource, and user service experience of high-speed and high-quality multi-stream data transmission is provided. In addition, utilization of a wireless access resource and a backhaul resource is maximized, congestion and a packet loss caused due to lack of backhaul resources are avoided, and a waste of a wireless resource on an access side is avoided.

An embodiment of the present application further provides an anchor, and the anchor may include the foregoing multi-stream data transmission apparatus. For descriptions of the multi-stream data transmission apparatus, refer to descriptions of the foregoing corresponding part, and details are not described herein.

Figure 20:
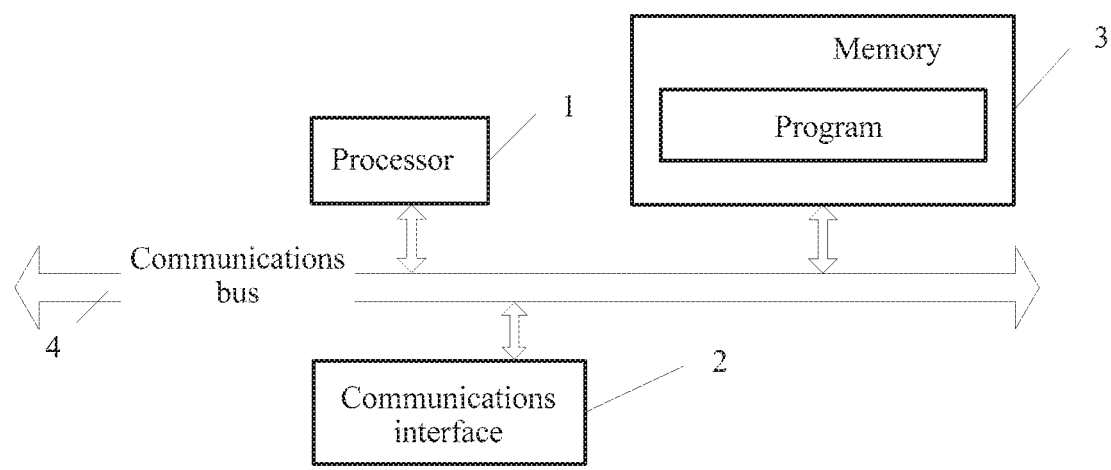
FIG. 20 is a hardware structural block diagram of an anchor according to an embodiment of the present application.

FIG. 20 shows a hardware structural block diagram of an anchor according to an embodiment of the present application. Referring to FIG. 20, the anchor may include a processor 1, a communications interface 2, a memory 3, and a communications bus 4.

The processor 1, the communications interface 2, and the memory 3 complete mutual communication by using the communications bus 4.

Optionally, the communications interface 2 may be an interface of a communications module, for example, an interface of a GSM module.

The processor 1 is configured to execute a program.

The memory 3 is configured to store a program.

The program may include program code, where the program code includes a computer operation instruction.

The processor 1 may be a central processing unit CPU, or an application-specific integrated circuit ASIC (Application Specific Integrated Circuit), or one or more integrated circuits configured to implement this embodiment of the present application.

The memory 3 may include a high-speed RAM memory, and may further include a non-volatile memory, for example, at least one disk memory.

The program may be specifically used to:

obtain resource availability data of all data transmission paths from the UE to the anchor, where the resource availability data includes resource data of wireless backhaul links between all access nodes and the anchor;

determine multiple target data transmission paths according to the resource availability data of all the data transmission paths; and transmit service data to the UE in a multi-stream manner by using the multiple target data transmission paths, where the multiple target data transmission paths include a corresponding wireless backhaul link that is established between a target access node and the anchor by using a wireless backhaul device, and the target access node is an access node that is in the at least one access node and that transmits the service data.

This embodiment of the present application further provides a multi-stream data transmission system. A structure of the multi-stream data transmission system is shown in FIG. 3, including at least one access node 20, an anchor 30, and a wireless backhaul device 40. Data transmission is performed between each access node and the anchor by using a wireless backhaul link established by using a wireless backhaul device, and an anchor air interface access link for direct data transmission exists between UE and the anchor.

In this embodiment of the present application, the anchor is configured to obtain resource availability data of all data transmission paths from the UE to the anchor, where the resource availability data includes resource data of wireless backhaul links between all access nodes and the anchor; determine multiple target data transmission paths according to the resource availability data of all the data transmission paths; and transmit service data to the UE in a multi-stream manner by using the multiple target data transmission paths, where the multiple target data transmission paths include a corresponding wireless backhaul link that is established between a target access node and the anchor by using a wireless backhaul device, and the target access node is an access node that is in the at least one access node and that transmits the service data; and the target access node is configured to send the service data to the UE by using the corresponding wireless backhaul link.

Optionally, the UE is further configured to transmit the service data to the anchor by using the multiple target data transmission paths, and the multiple target data transmission paths include the corresponding wireless backhaul link that is established between the target access node and the anchor by using the wireless backhaul device.

The anchor is further configured to receive, by using the multiple target data transmission paths, the service data sent by the UE, where the multiple target data transmission paths include the corresponding wireless backhaul link that is established between the target access node and the anchor by using the wireless backhaul device.

In this embodiment of the present application, in a macro-micro integrated networking architecture, dynamic multi-stream transmission is implemented with reference to a backhaul resource, and user service experience of high-speed and high-quality multi-stream data transmission is provided. In addition, utilization of a wireless access resource and a backhaul resource is maximized, congestion and a packet loss caused due to lack of backhaul resources are avoided, and a waste of a wireless resource on an access side is avoided.

The embodiments in this specification are all described in a progressive manner, for same or similar parts in the embodiments, reference may be made to these embodiments, and each embodiment focuses on a difference from other embodiments. The apparatus disclosed in the embodiments is described relatively simply because it corresponds to the method disclosed in the embodiments, and for portions related to those of the method, reference may be made to the description of the method.

What is claimed is:

1. A multi-stream data transmission system, comprising at least one access node, an anchor, and a wireless backhaul device, wherein data transmission is performed between each access node and the anchor by using a wireless backhaul link established by using the wireless backhaul device; wherein the anchor is configured to:
 obtain resource availability data of all data transmission paths from user equipment (UE) to the anchor, wherein the resource availability data comprises resource data of wireless backhaul links between all access nodes and the anchor;
 determine multiple target data transmission paths according to the resource availability data of all the data transmission paths;
 transmit service data to the UE in a multi-stream manner by using the multiple target data transmission paths, wherein the multiple target data transmission paths comprise a corresponding wireless backhaul link that is established between a target access node and the anchor by using the wireless backhaul device, and the target access node is an access node that is in the at least one access node and that transmits the service data;
 when resources of each target data transmission path are greater than a specified value, distribute data packets of the service data to a transmission path with low resource consumption; and
 when resources of a target data transmission path are less than the specified value, distribute high-priority data packets to a transmission path with sufficient resources, and distribute low-priority resources to a transmission path with strained resources; and the target access node is configured to send the service data to the UE by using the corresponding wireless backhaul link.

2. A multi-stream data transmission apparatus, based on a macro-micro integrated network, wherein the macro-micro integrated network comprises at least one access node, an anchor, and a wireless backhaul device, and data transmission is performed between each access node and the anchor by using a wireless backhaul link established by using a wireless backhaul device, wherein the apparatus is applied to the anchor, and the apparatus comprises:
  a processor; and
  a memory coupled to the processor, the memory comprising instructions that, when executed by the processor, cause the processor to:
    obtain resource availability data of all data transmission paths from user equipment (UE) to the anchor, wherein the resource availability data comprises resource data of wireless backhaul links between all access nodes and the anchor;
    determine multiple target data transmission paths according to the resource availability data of all the data transmission paths;
    transmit service data to the UE in a multi-stream manner by using the multiple target data transmission paths, wherein the multiple target data transmission paths comprise a corresponding wireless backhaul link that is established between a target access node and the anchor by using the wireless backhaul device, and the target access node is an access node that is in the at least one access node and that transmits the service data;
    when resources of each target data transmission path are greater than a specified value, distribute data packets of the service data to a transmission path with low resource consumption; and
    when resources of a target data transmission path are less than the specified value, distribute high-priority data packets to a transmission path with sufficient resources, and distribute low-priority data packets to a transmission path with strained resources.

3. The multi-stream data transmission apparatus according to claim 2, wherein the multiple target data transmission paths further comprise an anchor air interface access link between the UE and the anchor; and
  the corresponding wireless backhaul link that is established between the target access node and the anchor by using the wireless backhaul device comprises:
    at least one wireless backhaul link that is established between a base station and the anchor by using the wireless backhaul device; and/or
    at least one wireless backhaul link that is established between a wireless fidelity node (WIFI AP) and the anchor by using the wireless backhaul device.

4. The multi-stream data transmission apparatus according to claim 2, wherein the memory further comprises instructions that, when executed by the processor, cause the processor to:
  obtain resource data of air interface access links between all the access nodes and the UE;
  obtain the resource data of the wireless backhaul links between all the access nodes and the anchor; and
  obtain resource data of an anchor air interface access link between the UE and the anchor.

5. The multi-stream data transmission apparatus according to claim 4, wherein the memory further comprises instructions that, when executed by the processor, cause the processor to:
  after all the access nodes dynamically detect the resource data of the air interface access links between the access nodes and the UE in real time and preprocess the detected resource data of the air interface access links, obtain preprocessed resource data that is of the air interface access links and that is uploaded by all the access nodes;
  after the wireless backhaul device dynamically detects resource data of a corresponding wireless backhaul link and preprocesses the detected resource data, obtain preprocessed resource data uploaded by the wireless backhaul device; or
  when an access node and the anchor detect resource data of a wireless backhaul link between the access node and the anchor, obtain the detected preprocessed resource data; and
  after the anchor detects the resource data of the air interface access link between the UE and the anchor in real time, obtain the detected resource data of the air interface access link between the UE and the anchor.

6. The multi-stream data transmission apparatus according to claim 4, wherein the memory further comprises instructions that, when executed by the processor, cause the processor to:
  determine, according to a type of a service requested by the UE, whether the UE supports multi-stream transmission, a quantity of transmission paths between the UE and the anchor, resource availability on multiple transmission paths between the UE and the anchor, and resource availability between the anchor and a core network, whether to enable multi-stream data transmission; and
  when the type of the service requested by the UE requires multi-path transmission, the UE supports multi-path transmission, multiple transmission paths exist between the UE and the anchor, the resource availability on the multiple transmission paths between the UE and the anchor matches multi-path transmission, and the resource availability between the anchor and the core network matches multi-path transmission, enable multi-stream data transmission, so as to determine the multiple target data transmission paths after multi-stream data transmission is enabled.

7. The multi-stream data transmission apparatus according to claim 2, wherein the memory further comprises instructions that, when executed by the processor, cause the processor to:
  determine, according to a signal coverage area in which the UE is located, resource data of air interface access links between all the access nodes and the UE, the resource data of the wireless backhaul links between all the access nodes and the anchor, and resource data of an anchor air interface access link between the UE and the anchor, that data transmission paths that are located in the signal coverage area and whose link resources meet a predetermined condition are the target data transmission paths.

8. A multi-stream data transmission method, based on a macro-micro integrated network, wherein the macro-micro integrated network comprises at least one access node, an anchor, and a wireless backhaul device, and data transmission is performed between each access node and the anchor by using a wireless backhaul link established by using a wireless backhaul device, wherein the method is applied to the anchor, and the method comprises:
  obtaining resource availability data of all data transmission paths from user equipment (UE) to the anchor, wherein the resource availability data comprises resource data of wireless backhaul links between all access nodes and the anchor;

determining multiple target data transmission paths according to the resource availability data of all the data transmission paths;

transmitting service data to the UE in a multi-stream manner by using the multiple target data transmission paths, wherein the multiple target data transmission paths comprise a corresponding wireless backhaul link that is established between a target access node and the anchor by using the wireless backhaul device, and the target access node is an access node that is in the at least one access node and that transmits the service data;

when resources of each target data transmission path are greater than a specified value, distributing data packets of the service data to a transmission path with low resource consumption; and when resources of a target data transmission path are less than the specified value, distributing high-priority data packets to a transmission path with sufficient resources, and distributing low-priority data packets to a transmission path with strained resources.

9. The multi-stream data transmission method according to claim 8, wherein the multiple target data transmission paths further comprise an anchor air interface access link between the UE and the anchor; and the corresponding wireless backhaul link that is established between the target access node and the anchor by using the wireless backhaul device comprises:

at least one wireless backhaul link that is established between a base station and the anchor by using the wireless backhaul device; and/or at least one wireless backhaul link that is established between a WIFI AP and the anchor by using the wireless backhaul device.

10. The multi-stream data transmission method according to claim 8, wherein obtaining the resource availability data of all data transmission paths from the UE to the anchor comprises:

obtaining resource data of air interface access links between all the access nodes and the UE, the resource data of the wireless backhaul links between all the access nodes and the anchor, and resource data of an anchor air interface access link between the UE and the anchor.

11. The multi-stream data transmission method according to claim 10, wherein obtaining the resource data of air interface access links between all the access nodes and the UE comprises:

after all the access nodes dynamically detect the resource data of the air interface access links between the access nodes and the UE in real time and preprocess the detected resource data of the air interface access links, obtaining preprocessed resource data that is of the air interface access links and that is uploaded by all the access nodes;

obtaining the resource data of the wireless backhaul links between all the access nodes and the anchor comprises:

after a wireless backhaul device dynamically detects resource data of a corresponding wireless backhaul link and preprocesses the detected resource data, obtaining preprocessed resource data uploaded by the wireless backhaul device; or when an access node and the anchor detect resource data of a wireless backhaul link between the access node and the anchor, obtaining the detected preprocessed resource data; and obtaining resource data of an anchor air interface access link between the UE and the anchor comprises:

after the anchor detects the resource data of the air interface access link between the UE and the anchor in real time, obtaining the detected resource data of the air interface access link between the UE and the anchor.

12. The multi-stream data transmission method according to claim 10, wherein after obtaining, by the anchor, the resource availability data of all data transmission paths from the UE to the anchor, and before determining, by the anchor, the multiple target data transmission paths according to the resource availability data of all the data transmission paths, the method further comprises:

determining, according to a type of a service requested by the UE, whether the UE supports multi-stream transmission, a quantity of transmission paths between the UE and the anchor, resource availability on multiple transmission paths between the UE and the anchor, and resource availability between the anchor and a core network, whether to enable multi-stream data transmission; and when the type of the service requested by the UE requires multi-path transmission, the UE supports multi-path transmission, multiple transmission paths exist between the UE and the anchor, the resource availability on the multiple transmission paths between the UE and the anchor matches multi-path transmission, and the resource availability between the anchor and the core network matches multi-path transmission, enabling multi-stream data transmission, so as to determine the multiple target data transmission paths after multi-stream data transmission is enabled.

13. The multi-stream data transmission method according to claim 8, wherein determining, by the anchor, the multiple target data transmission paths according to the resource availability data of all the data transmission paths comprises:

determining, according to a signal coverage area in which the UE is located, resource data of air interface access links between all the access nodes and the UE, the resource data of the wireless backhaul links between all the access nodes and the anchor, and resource data of an anchor air interface access link between the UE and the anchor, that data transmission paths that are located in the signal coverage area and whose link resources meet a predetermined condition are the target data transmission paths.

14. The multi-stream data transmission method according to claim 8, further comprising:

receiving, by the anchor by using the multiple target data transmission paths, service data sent by the UE, wherein the multiple target data transmission paths comprises the corresponding wireless backhaul link that is established between the target access node and the anchor by using the wireless backhaul device.

* * * * *